3,430,079
CASCADED THERMIONIC CONVERTER
Joseph S. Danko, Pitcairn, Pa., and Peter J. McCoy, Danbury, Conn., assignors to Westinghouse Electric Corporation, East Pittsburgh, Pa., a corporation of Pennsylvania
Filed Dec. 12, 1961, Ser. No. 158,736
U.S. Cl. 310—4
Int. Cl. H02n 3/00; H01j 45/00
10 Claims The present invention relates to an arrangement for the direct conversion of heat into electricity and more particularly to a cascaded thermionic converter arranged in certain modifications thereof for use either with a radioisotopic or fluid heat source or with a nuclear reactor fuel element and in other modifications in further combination with a thermoelectric converting means.

Certain forms of the invention are adapted for incorporation into various types of heterogeneous nuclear reactors in which a nuclear chain reaction is induced within an array of relatively stationary fuel elements contained within the reactor. Desirably, the thermionic converting means of the invention is associated with each of these fuel elements. Certain or all of the fuel elements contain one or more of the fissionable isotopes $U^{233}$, $U^{235}$ and $Pu^{239}$ and are spaced relative to one another within the interior of the reactor so that a coolant fluid such as pressurized water, carbon dioxide, helium, liquid metal, or an organic material which is liquid at reactor operating temperatures, can be circulated among the fuel elements. Desirably, an electrically insulating coolant fluid such as an inert gas, an organic material, or de-ionized water is employed in order to avoid shorting out the anodes of the thermionic converter or the cold junctions of the thermoelectric converter if associated therewith. On the other hand, if an elecrically conducing coolant such as liquid metal is employed, a thin film of insulating material such as plasma-sprayed aluminum oxide can be employed on the conductive surfaces of the converter which are exposed to the coolant material.

Contrary to present operating procedures, a nuclear reactor is not inherently a low temperature device, but is presently so limited in its conventional forms by the character of the coolant materials which are employed. Another temperature limitation involves the fact that, without special constructions, known reactor designs are not readily capable of imparting a superheat to a working fluid such as steam. Both of these factors result in rather inefficient use of conventional thermodynamic generating equipment usually associated with the reactor in a nuclear power plant. The present invention, when combined with the reactor fuel elements, is adapted for converting a portion of a total reactor thermal output direcly into electrical energy and in doing so the conversion takes place in the areas of high temperatures gradient within the reactor core, that is to say, before the fissional heat is dissipated into the reactor coolant. When a thermionic converting stage is combined with the thermoelectric converter, the converters are so interrelated with the elevated portions of the temperature gradient that each component of the converter is operated at its optimum temperature ranges. The same holds true when the converter is combined with a radioisotopic or with a conventional heat source. When combined with a reactor, however, as described hereinafter, no heat energy is lost during the direct conversion process, inasmuch as any unused heat flux passing through the converter is removed from the reactor by circulation of the reactor coolant.

As in the case of the thermocouple, a single thermionic cell or converter suffers from the disadvantage that a potential of rather low magnitude is generated. This disadvantage is readily overcome in the case of thermocouples by connecting a large number of thermoelectric elements into an extended series of junctions or thermopile for energization by a single or closely spaced heat sources. Usable potentials derived from thermionic sources, however, are obtained only by series-connecting a relatively large number of thermionic cells. Where space limitations are controlling, however, this series arrangement is not practical due to the bulky nature of known forms of thermionic converters. Such space limitations are particularly disadvantageous in the case of reactor applications due to the required relatively close spacing between adjacent fuel elements. Although such fuel elements can be satisfactorily combined with a single thermionic cell, for the production of a usable potential for low voltage applications, previously proposed thermionic converters do not permit the employment of more than one thermionic cell with a given fuel element.

In view of the foregoing, an object of the present invention is the provision of novel and efficient means for converting thermal energy directly into electrical energy.

More specifically, it is an object of the invention to provide a thermionic type converter capable of producing electrical energy at relatively higher potentials.

A further object of the invention is the provision of novel, cascaded or series connected thermionic converting means adapted for use within a nuclear reactor or with a radioisotopic source of heat. More generally, it is an object of the invention to provide an energy converter of the character described, which can be adapted for use with any suitable source of heat, e.g., a heated fluid.

A more specific object of the invention is the provision of thermoelectric-cascaded thermionic converting means adapted for use with any of the aforementioned sources of heat.

Another object of the invention is the provision of a novel and efficient nuclear fuel element adapted for converting a portion of the fissional heat thereof directly into electrical energy.

A further object of the invention is the provision of a plurality of series-connected thermionic cells or stages which are thermally in parallel so that a common heat source can be employed for the thermionic series.

Still another object of the invention is the provision of the thermionic fuel element for a nuclear reactor in which the thermionic cathode means are heated indirectly and primarily by thermal radiation from the fuel material. An ancillary object is the provision of a thermionic fuel element in which the fuel material can be readily removed from the element.

Another object of the invention is the provision of thermionic converting means in which the quantity of supporting and electrically insulating material is minimized. An ancillary object is the provision of a thermionic converter having means associated therewith to prevent overheating of such supporting and insulating materials.

Another object of the invention is the provision of thermionic converting means which can be readily adapted to employ either a plasma or vacuum gap between the cathode and anode of the converter. Where a plasma gap is employed, it is an object of the invention to provide in a series connected array of thermionic cells means for distributing the plasma among the various cells of the converter from a single source means of the plasma.

Another object of the invention is the provision of combined thermionic-thermoelectric converting means in which cathode means and hot junction means of the thermionic and thermoelectric stages, respectively, are operated in thermal series and in which the thermionic stage is structurally arranged so that a portion of the heat is transferred directly by conduction from the cathode means to the hot junction means.

Still another object of the invention is the provision of thermionic and combined thermionic-thermoelectric converting means adapted for use with nuclear reactor fuel elements or other heat sources which are operative at extremely high temperatures. More specifically, it is an object of the invention to provide a thermoelectric-series thermionic converter for use with nuclear fuel material or other heat source at elevated temperatures. An ancillary object is the provision of high-temperature thermionic and combined thermionic-thermoelectric converting means of the character described and having novel means associated therewith for conducting deleterious heat away from certain constructional parts thereof.

These and other objects, features and advantages of the invention will be elaborated upon during the forthcoming description of illustrative modifications thereof, with the description being taken in conjunction of the accompanying drawings wherein.

In accordance with the invention, thermionic converting means are arranged in a cascaded relationship such that individual cells of a thermionic means are connected in electrical series while the cathodes thereof are arranged in thermal parallel. This arrangement affords an advantageously compact form of thermionic converter and in addition enables the converter to be energized from a single heat source if desired. The cascaded thermionic arrangement is further arranged so that the individual thermionic cells thereof are contained within a single sealed envelope.

In another form for the invention, the cascaded thermionic means is arranged for use in association with a thermoelectric, direct converting means or thermopile, arranged in one application of the invention exteriorly of the thermionic means. In other applications, thermionic means with or without the thermoelectric converting stage are arranged for association with a radioactive heat source such as a quantity of a radioisotope or a nuclear fuel element.

In certain modifications of the thermionic fuel element, an extremely high temperature fuel element is employed which is supported within the converter in a novel arrangement relative to the cathode means of the converter such that the major proportion of the fissional heat is radiated thermally outwardly of the surface of the fuel element to the inner surface of the cathode means. The latter form of the invention is further arranged such that the fuel element can be readily removed from the thermionic converter without disturbing the latter.

In still other arrangements of the invention, the thermionic means with or without the thermoelectric stage can be associated with a tube or conduit, such as a heat exchanging tube, arranged for conveying a high temperature fluid in order to supply heat to the cathode means of the thermionic converter.

Figures 1, 3:
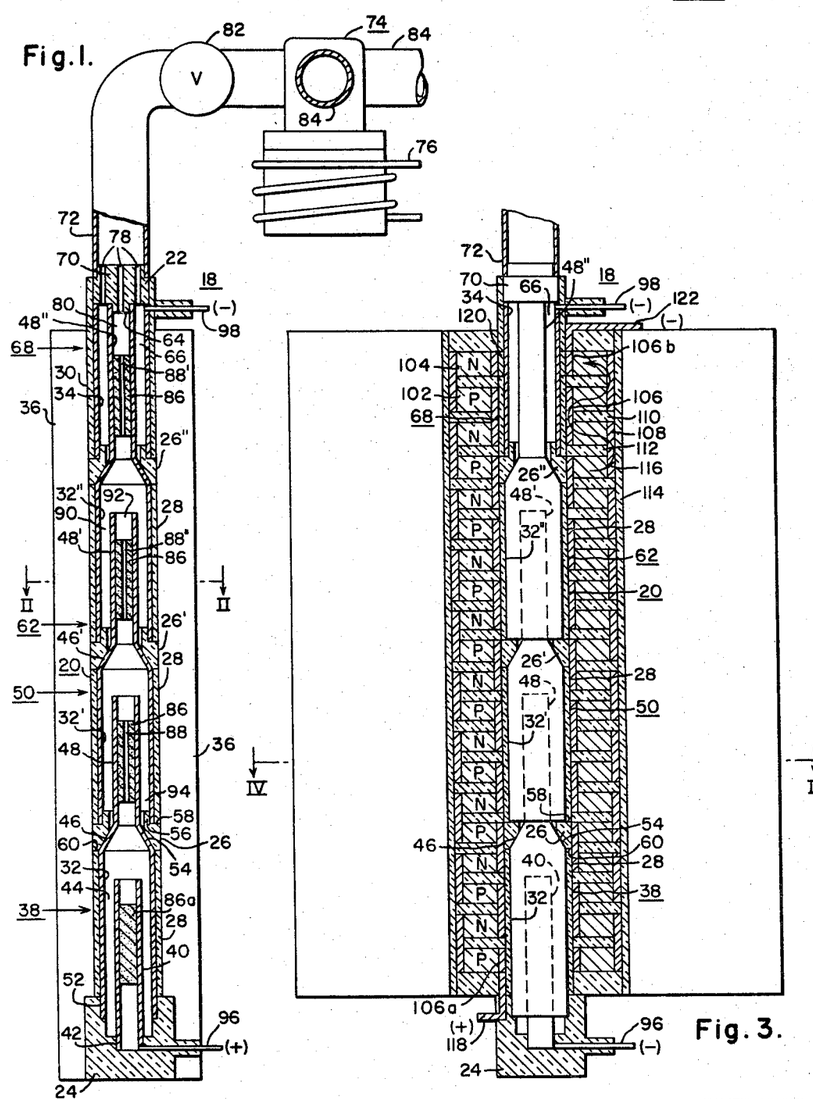
FIGURE 1 is a longitudinally sectioned view of a thermionic converter arranged in accordance with the teachings of the invention and adapted for the use with a "solid" heat source, such as a radioisotope.
FIG. 3 is a longitudinally sectioned view of another form of thermionic converter arranged according to the invention.
Figures 2, 4, 5, 6, 8:
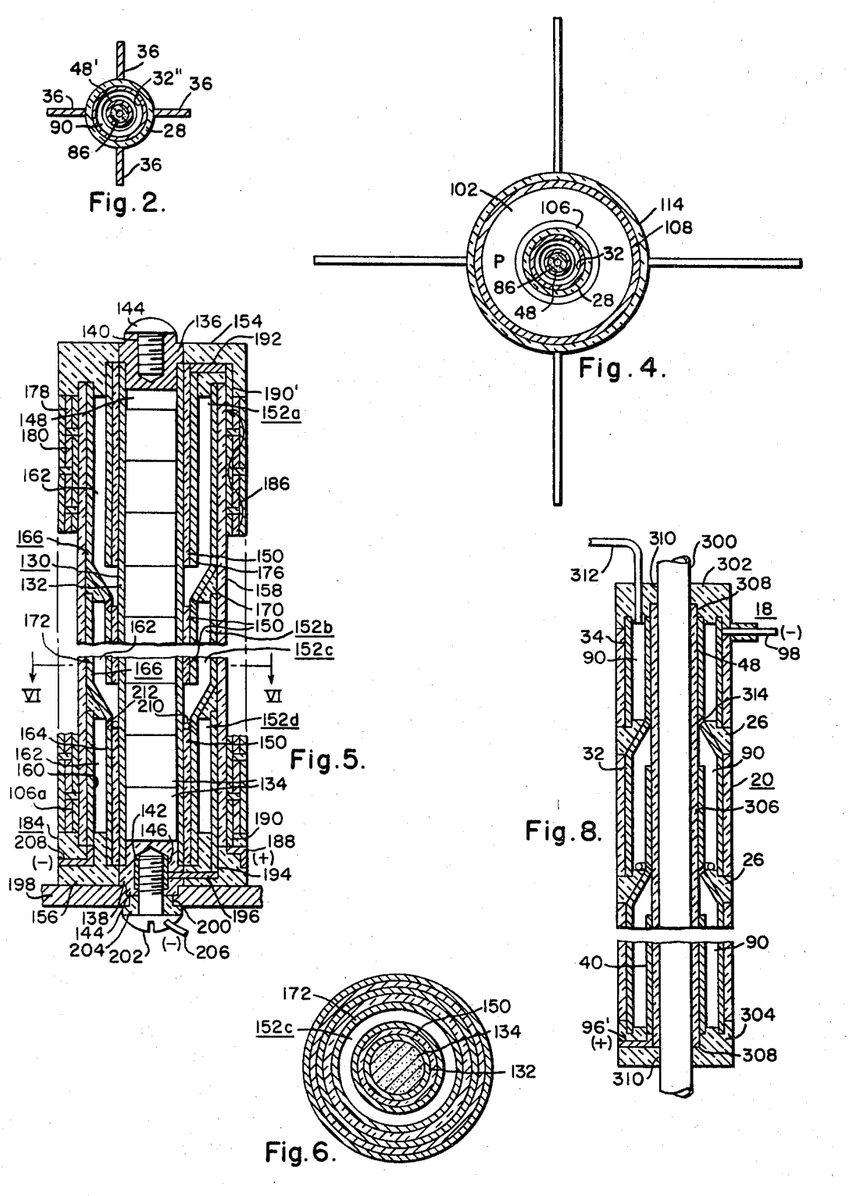
FIG. 2 is a cross-sectional view of the thermionic converter taken along reference lines II—II of FIG. 1.
FIG. 4 is a cross sectional view of the thermionic-thermoelectric converting device of FIG. 3 and taken along reference line IV—IV thereof.
FIG. 5 is a longitudinally sectioned view of still another form of thermionic-thermoelectric converter, as taught by the invention, and incorporating in accordance with the invention nuclear fuel material.
FIG. 6 is a cross sectional view of the thermionic-thermoelectric converter of FIG. 5 and taken along reference lines VI—VI thereof.
FIG. 8 is a longitudinally sectioned view of a modified form of the cascaded thermionic converter of FIG. 1 adapted for use as a heat exchanger tube or other conduit means through which a heated fluid can be passed.

Referring now more particularly to FIGS. 1 and 2 of the drawings, there is shown an illustrative form of the cascaded or series thermionic converter arranged in accordance with the teachings of the invention and adapted for use with a "solid" heat source, such as a mass of the radioisotope, $Cm^{242}$, $Po^{210}$ or $Pu^{238}$. In this novel formulation, the thermionic converter comprises an electrically insulating casing denoted generally by the reference character 20 and including upper and lower end plugs 22 and 24, respectively, as viewed in the drawings, insulating supporting annuli 26 and insulating sleeves 28 and 30 which desirably are applied by coating on the exterior surfaces of anode means 32 and 34 which are presently to be described. All of the insulating members or coatings denoted thus far can be fabricated from aluminum oxide or other fused ceramic insulating material such as BeO which is impervious to the passage of fluid therethrough. The aforementioned coatings 28 and 30 can be applied, for example, by plasma-spraying the aluminum oxide or other desired material. Various forms of plasma-spraying apparatus are known in the art. In addition, the aforementioned insulative materials must be capable of forming impervious ceramic-to-metal seals with the tungsten, molybdenum, niobium or the like structural material employed in the fabrication of the electrodes of the thermionic converter. In the case of sealing aluminum oxide and similar materials to the aforesaid structural materials, various effective methods are known in the art.

The casing 20, when thus constructed, is capable of being evacuated or of retaining an ionizable material such as cesium at relatively low pressures for purposes to be elaborated upon hereinafter.

For those applications wherein no forced circulation cooling is afforded to the outer surface of the insulative casing 20, radiative cooling means desirably are secured to the outer surface thereof. In this example of the invention, the cooling means are provided in the form of a plurality of radiating fins 36, with four such fins being employed in this example. In this arrangement the fins 36 are fabricated from a suitable heat conductive material such as aluminum or beryllium and are secured to the casing 20 by means of pressure bonding, brazing or shrink fitting.

Turning now to the electrode structure of the thermionic converter depicted in FIGS. 1 and 2, a first thermionic cell denoted generally by the reference character 38 includes a tubular cathode 40, which in this example is of right cylindrical configuration, although other configurations obviously can be used as dictated by application of the converter. The lower end of the cathode 40, as viewed in FIG. 1 of the drawings, is seated within a central recess 42 formed in the lower ceramic end plug 24. The cathode 40 extends vertically through the major proportion of the tubular cathode means 32, which also is a right cylindrical configuration in this example and which is disposed outwardly of and surrounding the cathode 40. Interelectrode spacing or plasma gap 44 forms the thermionic gap between the cathode and anode of the lowermost thermionic cell 38, the purpose of which gap is described more fully hereinafter.

At the upper end of the cathode means 32, as viewed in FIG. 1, an inwardly converging frustoconical section 46 is formed. The frustoconical section 46 in turn integrally engages tubular cathode means 48 of the next anode-cathode means 32–48 and is supported vertically of the thermionic converter 18 by insertion of the lower end of the cathode means 32 into annular recess 52 formed generally concentrically within the lower end plug 24 and surrounding the aforementioned central recess 42.

Upwardly of the anode-cathode means 32–48 a similar anode-cathode means 32′–48′ is mounted upon an insulating and supporting annulus 26. The annulus 26 includes an inwardly facing, complementary frustoconical surface 54 whereby the supporting annulus 26 is in turn supported on the outer surface of the frustoconical section 46 of the lowermost anode-cathode means 38–48. The annulus 26 further includes an upwardly extending annular protrusion 56 which is inserted into the lower end of the anode-cathode means 32′–48′ in order to position the latter substantially coaxially of the cathode means 48 and to define and maintain the associated interelectrode spacing. When thus assembled, the supporting annulus 26 in addition is furnished with upper and lower offset sections 58 and 60 which are aligned and sealed with the adjacent anode castings or coverings 28 to preserve the integrity of the casing 20.

It is to be understood that any reasonable number of anode-cathode means 32′–48′ can be employed depending upon the number of thermionic cells desired in the converter 18. In this example of the invention, however, four such cells are employed with the uppermost anode-cathode means 32″–48″ being supported in a manner similar to that described in the preceding paragraph in connection with the anode-cathode means 32′–48′. Thus, the anode-cathode means 32″–48″ is supported in a similar manner upon the adjacent supporting annulus 26′, which in turn is supported upon the next lower anode-cathode means and is sealed in the same manner as described above in connection with the supporting annulus 26. In this manner, then, the anode means 32″ together with the cathode means 48′ of the preceding anode-cathode means 32′–48′ form the thermionic cell 62.

The upper end of the cathode means 48′ which is relatively longer than the preceding cathode means 48 and 48′ in this example of the invention is supported against lateral movement by means of a downward extending cylindrical projection 64 affixed to the underside of the upper end plug 22. The projection 64 thus serves to stabilize the upper, otherwise free end of the cathode means 48″. For applications involving extreme shock or vibration similar plugs (not shown) can be inserted into the cathode means 32, 32′ and 32″ and into the adjacent upper ends of the cathode means 40, 48 and 48′, respectively.

The uppermost anode 34 in this example is provided also with a right cylindrical configuration and is supported upon the supporting annulus 26″ in a manner similar to that described previously in connection with the anode means 32, 32′ and 32″. The cathode means 48″ and the anode means 34, then, form the final cell 68 in the thermionic series comprising the converter 18 of FIG. 1.

In this example, the vertical length as viewed in FIG. 1, of the anode 34 substantially coextends with that of the cathode means 48″ such that the upper ends of the anode 34 and the cathode means 48 engage the under surface of the upper end plug 42 initially to aid in positioning the latter. Desirably, the outer periphery of the plug 22 lies in circumferential alignment with the outer periphery of the anode 34 such that the casing portion 30 can be sprayed or otherwise applied continuously over the exposed outer surface of the anode 34 and the plug 22.

The end plug 22 is further provided with an upwardly extending offset plug portion 70 which is capable of insertion into the adjacent end of conduit means 72, which couples the converter 18 to a suitable vapor generator 74. The vapor generator, provided with an electric heater 76, is capable of vaporizing an ionizable material such as cesium, the vapor of which is conducted through the conduit 72 and openings 78 of the end plug 22 whereby the cesium vapor is conducted to the inner electrode space 66 of the final thermionic cell 68 and into the interior space 80 of the cathode means 48″. From the space 80 the gaseous fill is conveyed to the interelectrode spaces of the remaining thermionic cells 62, 50 and 38 by means presently to be described.

The interior of the converter 18 is first evacuated before adding the aforementioned gaseous fill. The alkali metals lithium (5.36 volts); sodium (5.11 volts); potassium (4.33 volts); rubidium (4.13 volts) and cesium (3.86 volts) are suitable for use in this invention. The figures within the parentheses refer to the ionization potential of the respective materials. In an alternative embodiment, the source of alkali metal is omitted and after evacuating the space, the latter is filled with helium, and those cases where the isotopic material 86 and 86a exhibits attendent gamma radiation which is capable of ionizing the helium. The ionized helium or cesium or other alkali metal operates to neutralize the space charge normally associated with the cathode means. Alternatively, the aforementioned space charge can be reduced or eliminated by maintaining a very close spacing between the respective anode and cathode means of the order of 1 millimeter or less.

The conduit means 72 is provided with a valve 82 in order to regulate the quantity of gaseous fill to be supplied to the converter 18. Additional conduit means indicated generally by the terminal conduit portions 84 are coupled to the vapor generator 74 for supplying gaseous fill to similarly connected converters 18 (not shown).

In the arrangement of the invention as shown in FIG. 1, the multiple heat sources, as it were, are inserted respectively into the cathode means 40, 48, 48′ and 48″. Such heat sources here take the form of discrete portions 86 or 86a of a radioisotope such as $Cm^{242}$, $Po^{210}$, $Pu^{238}$ and are placed individually in closely fitting relationship within the aforementioned cathode means. When so positioned, the radioisotopic portions extend for a substantial proportion of the length of the associated cathode means and anode means respectively of each thermionic cell 38, 50, 62 and 68.

With the exception of a lowermost radioisotopic portion 86a, each of the portions 86 are provided with a central aperture 88 extending therethrough for the purpose of conveying a portion of the aforementioned gaseous fill to the interelectrode spacing of the next lower thermionic cell. Thus the uppermost portion 86 conveys gaseous fill entering the space 80 within the cathode means 48″ to the interelectrode space 90 of the next lower thermoionic cell 62, and so on.

In the operation of the converter 18, when the cathode means 40, 48, 48′ and 48″ are heated to sufficiently high temperature, electrons will be emitted from the surface of the cathode means and will travel radially and outwardly toward the associated anode means 32, 32′, 32″ and 34. When connected to an external load (not shown), these electrons will appear as current flowing through external positive and negative leads 96 and 98, respectively. The positive lead 96 is joined in this example to the lower end of the cathode 40 while the negative lead 98 is joined to the upper end of the anode 34. Thus, in operation, electrons flow from the cathode 40 across the interelectrode space 44 and to the adjacent anode means 32 and thence through the frustoconical connector 46 to the cathode means 48 of the succeeding thermionic cell. In this manner, electrons travel through the succeeding thermionic cells 50, 62 and 68 thence across the interelectrode space 66 to the final anode means 34. These electrons then appear as current flowing through the leads 96 and 98 and through suitable external connections (not shown) to the load and back to the lead 96 for delivery to the lowermost cathode 40. In this example of the invention, the migration of the electrons from the cathode means to the respective anode means across the spaces 44, 94, 90 and 66 is facilitated by the presence of positive ions within the converter 18. To dissipate the cloud of electrons, otherwise known as the space charge, which would tend to form around the cathode means, a relatively large number of positive ions are necessary. Satisfactory results have been obtained when the gaseous filling of the converter 18 maintained between 0.01 and 20 millimeters of mercury.

Referring now to FIGS. 3 and 4 of the drawings, the thermionic converter 18 is provided in conjunction with a thermoelectric converting stage denoted generally by the reference character 100 and supported on the outer, and in this example cylindrical, surface of the thermoionic converter casing 20. The thermionic converter 18' is essentially identical to that of FIGS. 1 and 2 and need not be further described save to say that the repeated reference characters in FIGS. 3 and 4 denote similar parts in FIGS. 1 and 2.

The thermoelectric stage, then, comprises a plurality of positive and negative thermoelectric members 102 and 104, respectively and arranged in an alternating or thermopile array along the length of the casing 20. The hot and cold junctions in the thermoelectric array are connected respectively by inner and outer cylindrical segments 106 and 108, with the inner segments 106 being disposed contiguously in heat transfer relationship with the outer surface of the thermionic casing 20. Save for the hot and cold junctions as aforesaid, the positive and negative thermoelectric elements 104 and 102 are otherwise insulated from one another by insulating washers 110 and 112 respectively. In addition, the inwardly extended insulating washers 112 electrically insulate adjacent hot junction segments 106 while the outwardly extended washers 110 perform the same function relative to the cold junction segments 108.

The insulating washers 110 and 112 can be fabricated from material capable of withstanding relatively high temperatures such as aluminum oxide, aluminum-silicon-magnesium oxide, or mica. The conductive segments 106 and 108 desirably are fabricated from iron, aluminum or copper. In this example, the thermoelectric elements 102 and 104 are formulated from P-type PbTe and N-type PbTe, respectively, which materials are well known in the art. The outer surfaces of the conductive, cold junction segments 108 desirably are coated with an insulating layer 114 which can be made from beryllium oxide or boron nitride.

When thus arranged and when heat is applied to the inner or hot junction segments 106 from the heat sources 86 and 86a, current flows through the thermoelectric series in a serpentine fashion as denoted by arrow 116 and upwardly through the array as viewed in FIG. 3 of the drawings. Thus, the lower terminal 118 becomes the positive lead of the thermoelectric series while the previously mentioned common negative terminal 98 is the negative lead for both the thermoelectric series and the thermionic converter in this example. The positive terminal 118 in this arrangement is connected directly to a relatively shorter inner segment 106a, while electric contact with the common negative terminal 98 is effectuated by a similar short inner segment 106b and an adjacent cylindrical segment 120 disposed inwardly of the segment 106b and brazed thereto and to the adjacent outer surface of the anode 34 of the final thermionic cell 68.

Alternatively, the segment 120 and the common negative connection therethrough can be omitted and the negative thermoelectric terminal can be provided by an L-shaped connector 122 coupled directly to the aforementioned shortened inner segment 106b. It is also contemplated that the positions of the positive and negative thermoelectric members 102 and 104 can be interchanged such that the lower thermoelectric terminal 118 becomes negative and the upper common terminal 98 becomes a series connection between the thermionic and thermoelectric stages.

With the arrangement according to FIGS. 3 and 4, the thermoelectric series and the thermionic series can be coupled in electric parallel or in the alternative case in electric series, while the cathode means of the thermnionic series and the hot junctions of the thermoelectric series are coupled in the thermal series. Thus, the thermionic-thermoelectric converter is capable of considerable design variation when employed as a power supply for one or more electric circuits. On the other hand, the operation of the cathode means and the hot junction means in thermal series permits each of the thermoelectric and thermionic stages to be operated at its optimum temperature gradient associated with the heat flux through the hermionic-thermoelectric converter.

With reference now to FIGS. 5 and 6 of the drawings, a thermionic-thermoelectric converter, which is generally similar to that described previously in connection with FIGS. 3 and 4, is associated in a novel manner with a nuclear fuel member denoted generally by the reference character 130 to form a reactor fuel element. The fuel member 130 in this example includes a generally cylindrical cladding tube 132 into which are inserted a plurality of fuel pellets 134. The ends of the cladding tube 132 are closed by means of upper and lower end plugs 136 and 138, respectively, as viewed in the drawings. Each of the end plugs are drilled and tapped at 140 for engagement with a suitable screw or other fastening device whereby the fuel element is secured to the end plates (not shown) of the nuclear reactor core. To aid in positioning the fuel element between the aforesaid end plates, each end plug 140 and 142 is provided with a circular projection 144 which cooperates with an associated counterbore (not shown) in the adjacent surface of the associated end plate. The lower end plug 138 desirably is fabricated from a ceramic material such as aluminum oxide and the tapped aperture 142 is afforded with a metallic conductive liner 146 for purposes of establishing electrical contact with the thermionnic-thermoelectric converter in a manner described hereinafter in greater detail.

In this example, the cladding tube 132 and the upper end plug 136 are fabricated from a corrosion resistant, low neutronic capture cross section material such as stainless steel, zirconium, niobium or one of its alloys. The fuel pellets 134 desirably are fabricated from a uranium, thorium or plutonium compound having an elevated melting point, such as the oxide and in this example uranium oxide ($UO_2$) is employed. An expansional space 148 is left at the top of the column of fuel pellets 134 to allow for differential expansion between the pellets and the cladding tube and to collect fissional gases emitted during operation of the reactor.

At spaced intervals along the length of the cladding tube 132 a plurality of insulating sleeves 150 are mounted. The insulating sleeves 150 are juxtaposed respectively to the thermionic converting cells 152a, 152b, 152c, and 152d. Although four such cells are shown in this example of the invention, it will be appreciated that a greater or lesser number of cells can be employed depending upon the relative lengths of the fuel member 130 and cells 152.

With the exception of the fuel member 130 having been substituted for the radioisotopic portions 86 and 86a of FIGS. 3 and 4, the thermionic-thermoelectric converter of FIGS. 5 and 6 is similar in its broad aspects to the converter of FIGS. 3 and 4. An important exception to this statement, however, is the fact that the thermionic electrode structure has been relatively reversed with respect to the thermoelectric series, and that the conduit means 72 and the associated vapor generator 74 have been omitted.

In the modification of the invention according to FIGS. 5 and 6, then, the thermionic stage of the converter is encased in vacuum-type fashion within the enlarged end caps 154 and 156 which are of annular configuration and which are sealed to the centrally disposed fuel member end plugs 136 and 138. In this example of the invention, the casing of the thermionic stage is completed by a continuous ceramic sleeve member 158 which is seated at its ends respectively into complementary offset portions in the adjacent surfaces of the end caps 154 and 156. Into the aforementioned offset portion of the lower end cap 156, as viewed in the drawings, there is also disposed the anode 160 of the lowermost thermionic cell 152d. Spaced inwardly of the anode 160 across interelectrode gap 162 is cathode means 164 forming part of the combined anode-cathode member 166. As stated previously, the cathode means 164 is electrically insulated from the cladding tube 132 of the fuel member 130 by means of the insulating sleeve 150. The sleeve 150 is, of course, disposed in heat transfer relation with both the cladding tube 150 and the inner surface of the cathode means 164. The anode-cathode member 166 is further supported and stabilized by engagement of its frustoconical section 168 with the insulating and supporting annulus 170. The annulus 170 further is provided with an offset portion for engagement with the upper end of the anode 160. When thus arranged the enlarged portion 172 of the anode-cathode member 166 serves as the anode means for the next succeeding thermionic cell 152c. The remainder of the anode-cathode members 166 are supported by an associated one of the supporting annuli 170 and also by engagement of their cathode portions 164 with the adjacent insulating sleeve 150 affixed to the outer surface of the cladding tube 132.

The uppermost one of the anode-cathode members 166 is mounted with its upper end inserted into a recess formed on the underside of the upper end cap 154. Similarly, the cylindrical cathode 176 of the uppermost thermionic cell 152a is inserted into an inwardly disposed recess of the top cap 154. As a result of the structure as aforesaid, the interelectrode gap 162 of each thermionic cell 152 is defined by the aforementioned annular recesses of the end caps 154 and 156 and by the frustoconical and offset surfaces of the supporting annuli 170 and further by engagement of each anode section with the casing or sleeve 158 and of each cathode section with the associated cladding tube insulation 150.

The thermoelectric stage of the converter of FIGS. 5 and 6 is fabricated in a manner similar to that described previously in connection with FIGS. 3 and 4. The N and P type thermoelectric materials 178 and 180 respectively are fabricated in segments of suitable axial length to meet the specific voltage-current requirements of the design and of such radial thickness to meet space limitations within the reactor core (not shown). Lateral periphery 182 and 184 of the end caps 154 and 156, respectively, are made circumferentially equal to the outer periphery of the thermoelectric series so as to present a smooth outer contour of the fuel element for the purposes of minimizing fluid friction in the reactor coolant flowing through the aforesaid core structure.

When thus arranged, the current path through the thermoelectric stage of the converter is essentially similar to that denoted by FIG. 3 of the drawings and is here again indicated by the arrow 186. When thus arranged, the positive terminal of the thermoelectric stage is disposed at the lower end of the converter, as viewed in FIG. 5, and is formed by contact members 188 and by a tab 190 extending downwardly from the lowermost inner conductive segment 106a. In this arrangement of the invention, assuming the impedances of the thermionic stage and of the thermoelectric stage have been substantially matched the positive output lead of the thermionic stage is coupled internally to the negative output lead of the thermoelectric stage for the purpose of coupling the stages in electric series. In furtherance of this purpose, the upper innermost tab 106b is also provided with a tab 190' for connection to a linking contact member 192 which in turn is electrically connected to the upper end of the cathode 176 forming part of the thermionic cell 152a. Thus, the linking contact 192 forms the positive lead of the thermionic stage and also the negative lead of the thermoelectric stage. Alternatively, both leads for each stage can be brought out separately in the manner noted previously in connection with FIGS. 3 and 4.

At the lower end of the converter as viewed in FIG. 5 of the drawings, the anode 160 of the lowermost thermionic cell 152d likewise is provided with the downwardly extending tab 194 for connection to the linking contact member 196. The linking member 196 extends through the intervening portion of the lower end cap 156 and the end plug 138 of the fuel member 130 for electric contact with the tapped sleeve or liner 146 inserted and sealed within the end plug 138 as described previously. Desirably, the liner 146 terminates short of the aperture in the end plug protrusion 144 to avoid contact with the lower end plate of the reactor core structure, indicated generally by the reference character 198. In furtherance of the same purpose, the aperture 200 also terminates short of the end plug aperture 142.

A suitable fastening means, for example the bolt 202 is extended through the end plate aperture 200 for threaded engagement with the liner 146 encased within the end plug 158. The passage of the bolt shank through the end plate 198 is insulated by means of an insulating, flanged tubular segment 204 fabricated from aluminum oxide or beryllium oxide or other suitable material. Electric contact can be established with the head of the bolt 202 by means of a suitable lead 206 spot welded thereto.

The contact arrangement just described lends itself well to connecting some or all of the fuel element converters of a reactor core assembly in electric parallel, as by electrically connecting the respective bolts 202 by means of their leads 206. Similarly, the positive terminals 188 of the fuel element converters can be connected in parallel in the manner shown and described in applicants' copending application Ser. No. 36,269, entitled "Combined Thermionic-Thermoelectric Converter," filed June 15, 1960, and assigned to the instant assignee. Alternatively, the specially formed lower end plug 138 can be eliminated and a plug similar to the upper end plug 136 can be substituted. In the latter arrangement, the tab 194 of the anode 160 desirably is shifted to a position diametrically opposite from the thermoelectric terminal 188. A similar L-shaped contact 208 is connected thereto and extends to the outer peripheral surface 184 of the lower end cap 156. With the positive and negative terminals 188 and 208 of the combined thermionic thermoelectric converter being on the same side of the end plate 198, either series, parallel or series-parallel electric circuit arrangements can be connected among the various fuel element converters comprising the aforsaid reactor core, in the manner for example described in the aforementioned copending application.

Where the interelectrode gaps 162 are not sufficiently small for reduction of the space charge normally associated with the cathode means 176 and 164 a ring member 210 formed from a vaporizable and ionizable material is supported within the thermionic stage of the converter. In this example of the invention where the converter is employed within a reactor core, the vaporizable material desirably is selected from the group comprising sodium, potassium, rubidium and cesium. At the initial stages of reactor operation, the vaporizable material 210 is vaporized by the heat of fission and the resultant vapor diffuses throughout the thermionic converting stage through apertures 212 formed in each of the anode-cathode members 166. Through these apertures all of the interelectrode gaps 162 communicate. Alternatively, the ring member 210 can be omitted and a gaseous fill of helium employed for this purpose, as explained previously in connection with FIGS. 1 and 2.

Figure 7:
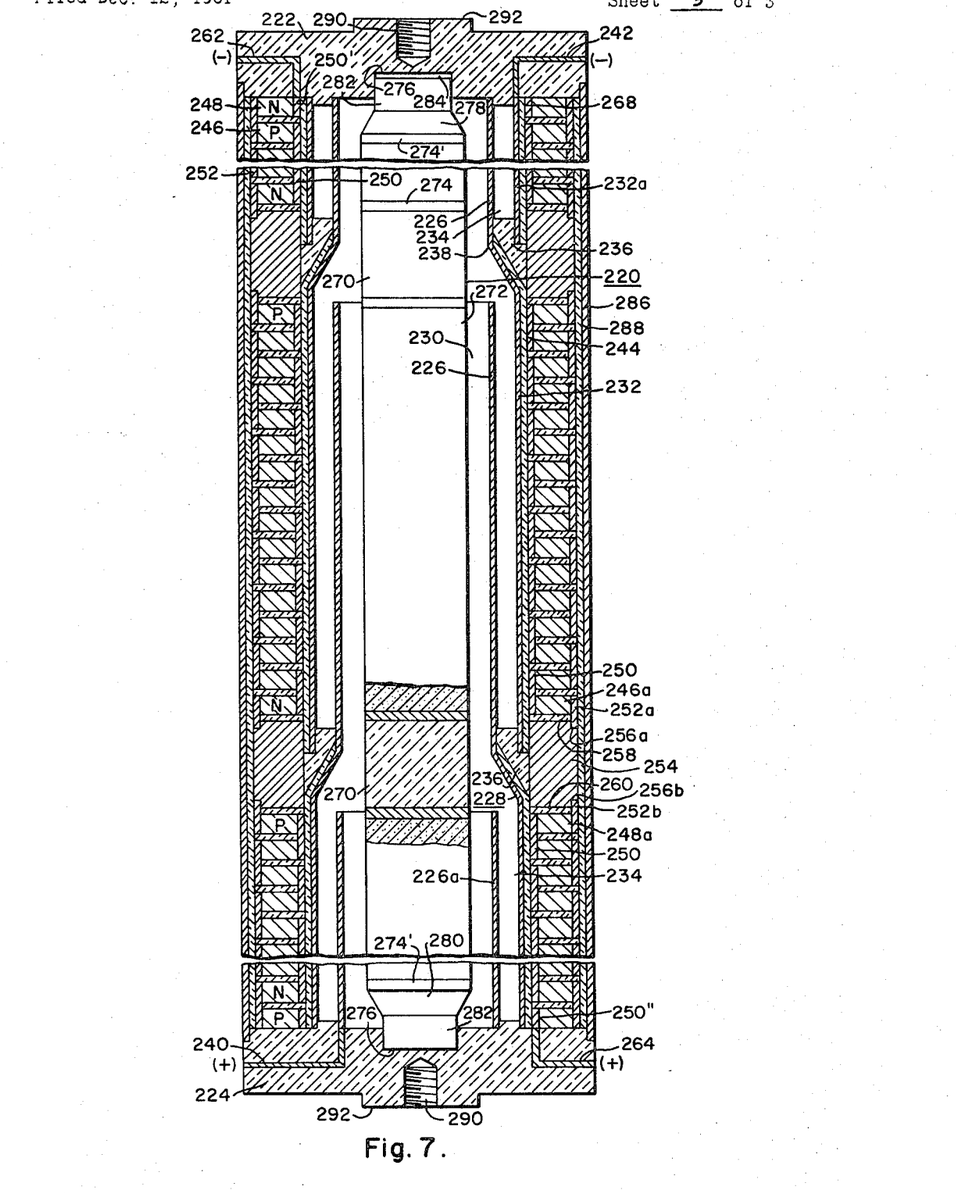
FIG. 7 is a longitudinally sectioned view of a modified form of a thermionic-thermoelectric fuel element arranged in accordance with the invention for use with a primarily thermally-radiating fuel element.

Referring now to FIG. 7 of the drawings, the thermionic-thermoelectric converter of the invention is modified for use with an extremely high temperature nuclear fuel member 220. The fuel member 220, in this arrangement of the invention, desirably is fabricated from a quantity of uranium carbide in solid solution with tantalum carbide or zirconium carbide, with the former being preferred for the more elevated temperature application. Other nuclear fuel compounds capable of withstanding elevation temperatures can, of course, be utilized. The fuel member 220 is supported and poistioned by ceramic annular end caps 222 and 224 to lie substantially coaxially and to be spaced inwardly of the thermionic series cathodes denoted generally by the reference character 226. As in previous modifications of the invention, the cathodes 226 with the exception of the lowermost cathode 226a form part of an anode-cathode member 228. When thus positioned, an annular space 230 laterally surrounds the fuel member 220 and separates the fuel member from the inner surfaces of the cathodes 226 and 226a. In this application of the invention, the operating temperature of the outer surface of the fuel member 220 lies in the range of 3000 to 3500° K.

Accordingly, substantially all of the heat emitted by the fuel member 220 is transferred by thermal radiation to the cathode surfaces. As a result, the cathodes 226 and 226a operate at an average temperature of about 2600° K. As in previous examples of the invention, the anode portions 232 of the anode-cathode member 228 are spaced outwardly of the cathode portions 226 of adjacent anode-cathode members 228. As a result, interlectrode spaces or gaps 234 are formed in each of the thermionic cells comprising the thermionic stage of the converter. With the exception of the lowermost anode-cathode member, these members are supported on insulating and supporting annuli 236, which have been described previously. Similarly, the interelectrode gaps 234 communicate through openings 238 extending through the frusto-conical sections of each of the anode-cathode members 228.

The positive and negative leads of the thermionic stage are brought out to the lower and upper end caps 224 to 222 respectively. Thus, for the positive terminal an L-shaped contact 240 extends through the lower end cap 224 for engagement with the lowermost cathode 226a. Similarly, an L-shaped contact 242 comprising the negative terminal of the thermionic stage extends through the upper end cap 222 for engagement with the upper most anode member 232a.

The outer surfaces of the anodes 232 and 232a are provided with an insulating covering 244, of aluminum oxide or beryllium oxide or the like, which can be applied by flame or plasma spraying. The purpose of the coatings 244 is to form, with the end caps 222 and 224 and the supporting annuli 236, an impervious casing for the thermionic stage.

On the outer surfaces of the anode means 232 and 232a are disposed a thermoelectric direct converting stage, which, in this arrangement of the invention, is made discontinuous or interrupted along the length of the converter of FIG. 7. Thus, the thermoelectric series comprises a plurality of alternating positive and negative thermoelectric members 246 and 248 which are arranged into hot and cold junctions with inner and outer tubular segments 250 and 252, respectively. The thermoelectric series is further arranged with insulating washers in the manner described previously in connection with FIG. 3 of the drawings. However, in this arrangement, the thermoelectric series is interrupted at spaced intervals along the length of the converter by a plurality of heat sink members 254 which coextend longitudinally with the annular supporting members 236, adjacent which the heat sink members 254 are disposed respectively. The heat sink members 254 preferably are fabricated from a relatively good heat conductor, such as niobium, tantalum or molybdenum, which in addition is capable of operating at elevated temperatures. The purpose of the heat sink members 254 is rapidly to conduct heat outwardly from the supporting annuli 236 and the associated metal-to-ceramic seals to avoid the placing of undue thermal stresses upon the seals and supporting annuli.

Although the thermoelectric series are physically interrupted by the heat sink members 254, the heat sink members which are electrically insulated from the adjacent portions of the thermionic anode and cathode portions by means of the coverings 244 and the supporting annuli 236, are also employed to maintain the continuity of the electric circuit through the thermoelectric series. This is accomplished by joining the adjacent cold junction segments 252a and 252b thereto so that each heat sink member 254 in effect completes the cold junction between the adjacent positive and negative thermoelectric members 246a and 248a respectively.

In furtherance of this purpose, the adjacent cold junction segment 252a and 252b extend into close refitting engagement with annular offset portions 256a and 256b respectively formed adjacent the outer periphery of the heat sink member 254. The adjacent thermoelectric members 246a and 248a otherwise are insulated from the heat sink member 254 by means of insulating washers 258 and 260.

Electrical contact is made with the thermoelectric stage in a manner similar to that described above in connection with the thermionic stage contacts 242 and 240. Thus, the upper end cap 222 contains an L-shaped contact 262 which is joined to a shortened hot junction segment 250' to form the negative lead of the thermoelectric series. In a like manner, the lower end cap 224 is provided also with an L-shaped contact member 264 which is joined to a similarly shortened hot junction segment 250" at the lower end of the thermoelectric series, as viewed in FIG. 7. The latter terminal then forms the positive lead for the thermoelectric stage. Alternatively, either the negative thermoelectric lead 262 or the negative thermionic lead 242 can be removed and these leads can be connected internally by removing the intervening portion of the covering member 244, as denoted by the dashed lines 268 and the shortened inner or hot junction segment 255 can be connected electrically to the adjacent outer surface of the cathode 232a. It is also contemplated that the positions of the positive and negative thermoelectric members can be interchanged so that the polarity of the thermoelectric leads 262 and 264 will be reversed to facilitate series-connection of the thermionic and thermoelectric stages, if desired, in the manner explained previously in connection with FIGS. 3 and 5.

As indicated previously, the fuel member 220 is fabricated from a mixture of uranium carbide and tantalum carbide or similar high temperature materials. The uranium carbide can be dispersed continuously along the length of the fuel member 220 or, in the arrangement shown in FIG. 7, gaps in the uranium carbide dispersion can be provided at regular intervals along the length of the fuel member. In this arrangement, then, the gaps 270 are occupied by ceramic blank members which are free of fissioning material but are fabricated from a high temperature, relatively low heat-conductive material such as zirconium oxide. With this arrangement, the blank members 270 are disposed respectively adjacent the supporting annuli 236 and the associated seals. As a result, the radiated heat flux from the fuel member 220 is minimized at these points to further minimize the heat supplied to the ceramic supporting annuli 236. The fuel bearing portions 272 and the blank members 270 are secured to one another by effecting metal-to-ceramic seals respectively between the ceramic members 272 and 270 and metallic sealing discs 274 disposed one at each end of the gap member 270. The sealing discs 274 can be formed from tungsten or tantalum or other suitable high temperature material.

In order to support the fuel member 20 in the manner shown, the inner surface of each of the end caps is provided with a central recess 276, into which the end pieces 278 and 280 of the fuel member 220 are closely but detachably fitted. In furtherance of this purpose, the end pieces 278 and 280 are each necked down to an outwardly extending cylindrical projection 282 shaped complementarily with the associated recess 276. Desirably, the upper end piece 278 does not extend to the full height of the recess so that a differential expansional space 284 is provided. The end pieces 278 and 280 likewise can be formed from zirconium oxide, tantalum oxide, thorium oxide or other high temperature material and are joined to the remainder of the fuel member 220 by similar sealing discs 274' and metal-to-ceramic seals made in a known fashion.

With this arrangement of the fuel member 220, the latter can be readily removed from the thermionic-thermoelectric fuel element in FIG. 7 simply by removing one of the end caps 222 or 224 and withdrawing the fuel member 220 from engagement with the recess in the other end cap. Each end cap 222 or 4 is secured to the adjacent thermionic casing member 24 and to the outer metallic sheath 286 extending continuously along the thermoelectric stage of the converter. Thus, the thermionic stage is sealed vacuum tight wihtin the covering 244 and end cap 222 and 224 while the thermoelectric stage is sealed against entry of foreign matter by means of the sheath 286 and the aforesaid end caps. The sheath 286 is insulated from the outer tubular or cold junction segments 252 by an insulating coating 288 applied to their outer surfaces, for example by flame or plasma-spraying. Suitable materials for this purpose are aluminum oxide and beryllium oxide.

When thus fabricated the fuel element of FIG. 7 is secured between the end plates (not shown) of a suitable reactor core structure by means of filister headed screws inserted through the aforesaid end plates into recesses 290 of each end cap 222 or 224. Prior to fastening in this manner, the fuel element is positioned by insertion of the projections 292 surrounding the tap recess 290 and insertable into complementary counterbored portions of the aforesaid end plate or other supporting members. Desirably, the end plates 222 and 224 are fabricated from high temperature, electrically insulated material, and for example, the materials mentioned previously in connection with the end pieces 278 and 280 can be utilized. The aforementioned terminals extending through the end caps 222 and 224 can be contacted, when an array of fuel elements made in accordance with FIG. 7 are mounted within a reactor, but means of the conductive straps described in the aforementioned copending application.

Referring now to FIG. 8 of the drawings, the thermionic series arrangement of the invention is adapted for heating by a flowing, high temperature fluid and thus is associated with a continuous fluid conduit 300 fabricated from a suitable material depending upon the temperature of the fluid. The arrangement of FIG. 8 is generally similar to that of FIG. 1 with the exception that the thermionic converter 18″ is provided with end caps 302 and 304 of annular configuration in order to accommodate passage of the conduit 300. The outer casing 20 of the converter 18″ is fabricated and sealed to the end plugs 302 and 304 and to the supporting annuli 26 in the manner described previously in connection with FIG. 1. The vacuum integrity of the converter 18″, however, is maintained by seating and sealing an inner casing member into offset portions 308 disposed in each end cap 302 or 304 adjacent the central opening 310 thereof. For this purpose, of course, the inner casing 306 extends continuously between the end caps 302 and 304.

The inner casing 306 is fabricated from an electrically insulating and relatively good heat conductive material such as tantalum carbide. For relatively lower temperature applications, aluminum oxide or beryllium oxide can be employed. Desirably, the outer surface of the inner sleeve 306 for closely fitting engagement with the inner surfaces of the cathode means 40 and 48. In order to reduce the space charge within the interelectrode gaps 90 of the converter 18″ an ionizable material can be employed as explained previously with reference to FIG. 7 or alternatively, cesium or the like is supplied through a feed tube 312 extending through the end cap 302 from a suitable source such as the vapor generator 74 of FIG. 1. Inasmuch as the cathode means 40 and 48 of the anode-cathode members 32–48 are closely fitted with the inner casing member 306, a plurality of diffusion openings 314 are provided in each of the anode-cathode members adjacent the necked down portion thereof to permit the vapor of the aforesaid ionizable media to diffuse throughout the converter 18″. Positive and negative leads 96' and 98' are connected to the endmost cathode 40 and anode 34 respectively in the manner described previously in connection with FIG. 1.

The conduit 300 in this example of the invention is closely but detachably fitted within the inner casing member 306 and the central openings 310 of the end caps 302 and 304. With this arrangement the conduit 300 is disposed in good heat transfer relationship with the inner casing member 306 and hence with the cathode means 40 and 48. On the other hand, the converter 18″ can be removed from the conduit 300 if desired for repair or replacement thereof.

If desired, the outer surface of the converter 18″ can be furnished with radiative fins such as those described in connection with FIG. 1 or with the thermoelectric stage 100 and fin structure shown in FIG. 3 or with the thermoelectric series arrangement of FIG. 7 with or without the radiative fins of FIG. 3, depending upon application of the invention.

Alternatively, the inner casing member 306 can be eliminated and the vacuum integrity of the converter 18' can be effected by sealing the conduit 300 at its passage through the end cap 302 and 304, respectively. With this arrangement, then, the conduit 300 if fabricated from a conductive material is electrically insulated from the inner surfaces of the cathode means 40 and 48 by an annular gap left after removal of the inner casing member 306. The latter arrangement is particularly useful in extremely high temperature applications where substantially all of the heat emitted from the outer surface of the conduit 300 would be conveyed by thermal radiation to the adjacent inner surfaces of the cathode means 40 and 48.

From the foregoing, it will be seen that novel and efficient forms of thermionic and thermoelectric converters and converter combinations are disclosed herein. Salient features of the invention include a unique arrangement for connecting a plurality of thermionic cells in series for increased potential output and their novel association with a thermoelectric converting stage. The foregoing modifications of the invention are presented in elucidation thereof and not in a limiting sense. Therefore, numerous modifications of the invention will occur to those skilled in the art without departing from the spirit and scope of the invention. Moreover, it is to be understood that certain features of the invention can be employed without a corresponding use of other features.

Therefore, what is claimed as new is:

1. A thermionic converter comprising an elongated insulating casing, a plurality of supporting members within said casing and spaced along the length thereof, a plurality of conductive generally tubular one-piece anode-cathode members mounted on said supports respectively, each of said anode-cathode members including an enlarged tubular anode portion and a reduced integral tubular cathode portion mounted in tandem thereto, said supports being spaced such that the cathode portion of at least one of said anode-cathode members is positioned within the anode portion of an adjacent anode-cathode member to form a plurality of series connected thermionic cells along the interior length of said casing, heat emitting means juxtaposed to said cathode portions in heat transfer relationship therewith, and circuit means for connecting said series connected cells to external electric circuitry.

2. A thermionic converter comprising a generally tubular insulating casing, a plurality of conductive generally tubular one-piece anode-cathode members supported within said casing and spaced along the length thereof, each of said anode-cathode members including an enlarged anode portion closely fitted within the walls of said casing an an integral reduced cathode portion separated from said anode portion by an integral intermediate necked down portion, the cathode portion of at least one of said anode-cathode members extending into and along at least a major proportion of the length of the anode portion of an adjacent anode-cathode member to form an interelectrode gap therebetween, heat emitting means disposed within said casing in juxtaposed relationship with said cathode portions in heat transfer relationship therewith, and circuit means for connecting said anode-cathode members in series and to external electric circuitry.

3. A thermionic converter comprising an insulating casing, a plurality of unitary conductive interfitting generally tubular anode-cathode members disposed in a tandem array within said casing, the cathode portion of at least one of said anode-cathode members being spaced inserted within and juxtoposed to to the anode portion of an adjacent anode-cathode member to connect said anode-cathode members into thermionic series, terminal means secured adjacent the ends of said series respectively for connecting said series to external electrical circuitry, a a plurality of portions of radioactive heat emitting material, said portions being contained respectively within said cathode portions in heat transfer relationship therewith, an ionizable gaseous fill within said casing, and each of said heat emitting portions having an aperture extending longitudinally therethrough and communicating with the spaces associated with the adjacent cathode portions so that said gaseous fill can permeate all of the spaces within said casing.

4. A thermionic-thermoelectric converter comprising an insulating tubular casing, a plurality of generally tubular interfitting anode-cathode members disposed within said casing in a tandem array, the cathode portions of said members being of reduced cross section and at least one of said portions being spacedly inserted into the anode portion of an adjacent member to connect said members into thermionic series, the anode portions of said members being fitted closely within said casing in heat transfer relation therewith, heat emitting means mounted within said casing in heat transfer relationship with said cathode portions, a plurality of positive and negative thermoelectric members mounted in an alternating array on the exterior of said casing, a number of relatively short tubular segments disposed in tandem along the length of said thermoelectric array, said segments being joined to adjacent pairs of positive and negative members and being closely fitted about the outer surface of said casing in heat transfer relationship therewith to form hot junctions among said thermoelectric members, means spaced from said casing for forming cold junctions among said thermoelectric members, and terminal means coupled to said thermionic and said thermoelectric series for connecting said converter to external electrical circuitry.

5. The thermionic-thermoelectric converter according to claim 4 wherein the cathode portion of each anode-cathode member is disposed in thermally conductive relationship with the anode portion thereof to supply heat by conduction directly from said cathode portion to said casing and to the hot junction segments of said thermoelectric array.

6. A thermionic-thermoelectric converter comprising an elongated insulating casing, a plurality of electrically insulating supporting members secured to the inner walls of said casing and disposed along the length thereof, a plurality of anode-cathode members mounted along the length of said casing and on said supporting members respectively, the cathode portion of at least one of said members being juxtaposed to the anode portion of an adjacent anode-cathode member to form a thermionic series within said casing, heat emitting means disposed within said casing and juxtaposed to said cathode portions, a plurality of heat sink members mounted on the external surface of said casing and adjacent said supporting members respectively to conduct deleterious heat away therefrom, and a plurality of thermoelectric series mounted with their hot junctions on the exterior surfaces of said casing at positions respectively between said heat sink members.

7. A thermionic-thermoelectric converter comprising an elongated insulating casing, a plurality of unitary tubular electrically insulating supporting members secured to the inner walls of said casing and spaced along the length thereof, a plurality of conducting generally tubular anode-cathode members mounted along the length of said casing and on said supporting members respectively, the cathode portion of at least one of said members being spacedly inserted within and juxtaposed to the anode portion of an adjacent anode-cathode member to form a thermionic series within said casing, heat emitting means disposed within said casing and juxtaposed to said cathode portions, and a plurality of thermoelectric heat sink members mounted on the external surface of said casing and adjacent said supporting members respectively to conduct deleterious heat away therefrom.

8. A thermoionic-thermoelectric converter comprising an elongated insulating casing, a plurality of electrically insulating supporting members secured to the inner walls of said casing and disposed along the length thereof, a plurality of anode-cathode members mounted along the length of said casing and on said supporting member respectively, the cathode portion of at least one of said members being juxtaposed to the anode portion of an adjacent anode-cathode member to form a thermionic series within said casing, heat-emitting means disposed within said casing and juxtaposed to said cathode portions, a plurality of heat sink members mounted on the external surface of said casing and adjacent said supporting members respectively to conduct deleterious heat away therefrom, and a plurality of thermoelectric series mounted with their hot junctions on the exterior surface of said casing at positions respectively between said heat sink member, said heat sink members in addition each being connected to the adjacent ends of said thermoelectric series as cold junctions therebetween to form continuous thermoelectric series along the length of said casing, and terminal means joined adjacent the ends of said thermionic series and said continuous thermoelectric series respectively for connecting said converter to external electrical circuitry.

9. The thermionic-thermoelectric converter according to claim 6 wherein the heat emitting means includes a nuclear fuel member coextending substantially with the length of said thermionic series and having nuclearly inert sections disposed along its length and adjacent said supporting members to minimize the quantity of heat transferred from said fuel member to said supporting members.

10. A thermionic-thermoelectric converter comprising an elongated generally tubular insulating casing, a plurality of annular electrically insulating supporting members mounted on the inner wall of said casing and spaced along the length thereof, a plurality of interfitting generally tubular anode-cathode members arranged in a tandem array within said casing and supported respectively on said supporting members, the cathode portion of at least one of said anode-cathode members being of reduced cross section and spacedly inserted into the anode portion of an adjacent anode-cathode member to connect said members into thermionic series, a nuclear fuel member mounted generally centrally and spacedly within said cathode portions in heat transfer relationship therewith, said fuel member extending the length of said casing and having relatively short nuclearly inert sections spaced along its length and disposed respectively adjacent said supporting members to minimize the fissile heat transferred thereto, said anode portions being closely fitted within casing and said cathode portions and said anode portions being constructed of a thermally conductive material to transfer a portion of said fissile heat directly from said cathode portions to said casing through thermal conduction, a plurality of annular heat sink members mounted on the external surface of said casing and spaced along its length at positions adjacent said supporting members, said heat sink members being formed of a thermally conductive material to conduct deleterious heat away from said supporting members, a plurality of positive and negative thermoelectric members mounted on the exterior of said casing and extending in an alternating array substantially the length of said casing, a plurality of relatively short tubular connecting members joining adjacent pairs of positive and negative thermoelectric elements respectively and closely fitted on the external surface of said casing in heat transfer relation therewith, said connecting members forming hot junctions in said thermoelectric array, means spaced from the external surface of said casing for forming cold junctions in said thermoelectric array, said heat sink members in addition being fabricated from an electrically conductive material and being joined to adjacent ones of said positive and negative members to form cold junctions therebetween, and terminal means for connecting said thermionic series in said thermoelectric array to external electrical circuitry.

References Cited

UNITED STATES PATENTS

| | | | |
|---|---|---|---|
| 2,517,120 | 8/1950 | Linder | 313—1 X |
| 2,980,819 | 4/1961 | Feaster | 310—4 X |
| 3,176,165 | 3/1965 | Lawrence | 310—4 |
| 3,201,619 | 8/1965 | Gleason | 310—4 |
| 3,248,577 | 4/1966 | Hoh | 310—4 |

FOREIGN PATENTS

| | | |
|---|---|---|
| 627,049 | 5/1927 | France. |
| 797,872 | 7/1958 | Great Britain. |

DAVID X. SLINEY, *Primary Examiner.*